United States Patent Office 3,544,553
Patented Dec. 1, 1970

3,544,553
SCILLIGLAUCOSIDIN-19-OL-α-L-RHAMNOSIDE
Franz Pattermann, Ingelheim am Rhein, Germany, assignor to Boehringer Ingelheim G.m.b.H., Ingelheim am Rhein, Germany, a corporation of Germany
Filed Apr. 4, 1968, Ser. No. 718,736
Claims priority, application Germany, Apr. 17, 1967, B 92,100
Int. Cl. C07c *173/00*
U.S. Cl. 260—210.5                                      1 Claim

ABSTRACT OF THE DISCLOSURE

A new cardiac-active glycoside, scilliglaucosidin-19-ol-α-L-rhamnoside, useful for increasing the ability of the heart muscle to contract and changing the heart beat frequency in warm-blooded animals, and a method of preparing said glycoside from scilliglaucosidin-α-L-rhamnoside by reduction with metal hydrides.

---

This invention relates to a novel cardiac-active glycoside, namely, scilliglaucosidin-19-ol-α-L-rhamnoside, as well as to a method of preparing the same from scilliglaucosidin-α-L-rhamnoside.

In my copending application Ser. No. 670,719, filed Sept. 26, 1967, I disclose scilliglaucosidin-α-L-rhamnoside and a method of isolating the same from the waste liquor of the conventional recovery procedure for proscillaridin-A from white squill.

I have now discovered that another novel cardiac-active glycoside, namely, scilliglaucosidin-19-ol-α-L-rhamoside, is obtained by reducing scilliglaucosidin-α-L-rhamnoside with a complex metal hydride, such as sodium borohydride, potassium borohydride, lithium borohydride, magnesium borohydride, sodium trimethoxy borohydride [Na(OCH$_3$)$_3$BH] or lithium aluminum hydride.

The reduction of scilliglaucosidin-α-L-rhamnoside is preferably carried out in the presence of a lower alkanol, such as methanol or ethanol or aqueous mixtures of either, or in the presence of dioxane or aqueous mixtures thereof; the preferred reducing agent is sodium borohydride, which is simple to handle in these solvents. To effect the reduction, an alcoholic or aqueous alcoholic solution of scilliglaucosidin-α-L-rhamnoside is admixed with an excess amount of sodium borohydride, and the mixture is stirred for one-half to one hour at room temperature, whereby the 10-formyl group in the starting material is quantitatively converted to the hydroxymethyl group, while the remainder of the molecule does not undergo any chemical change whatever.

Figure 1:
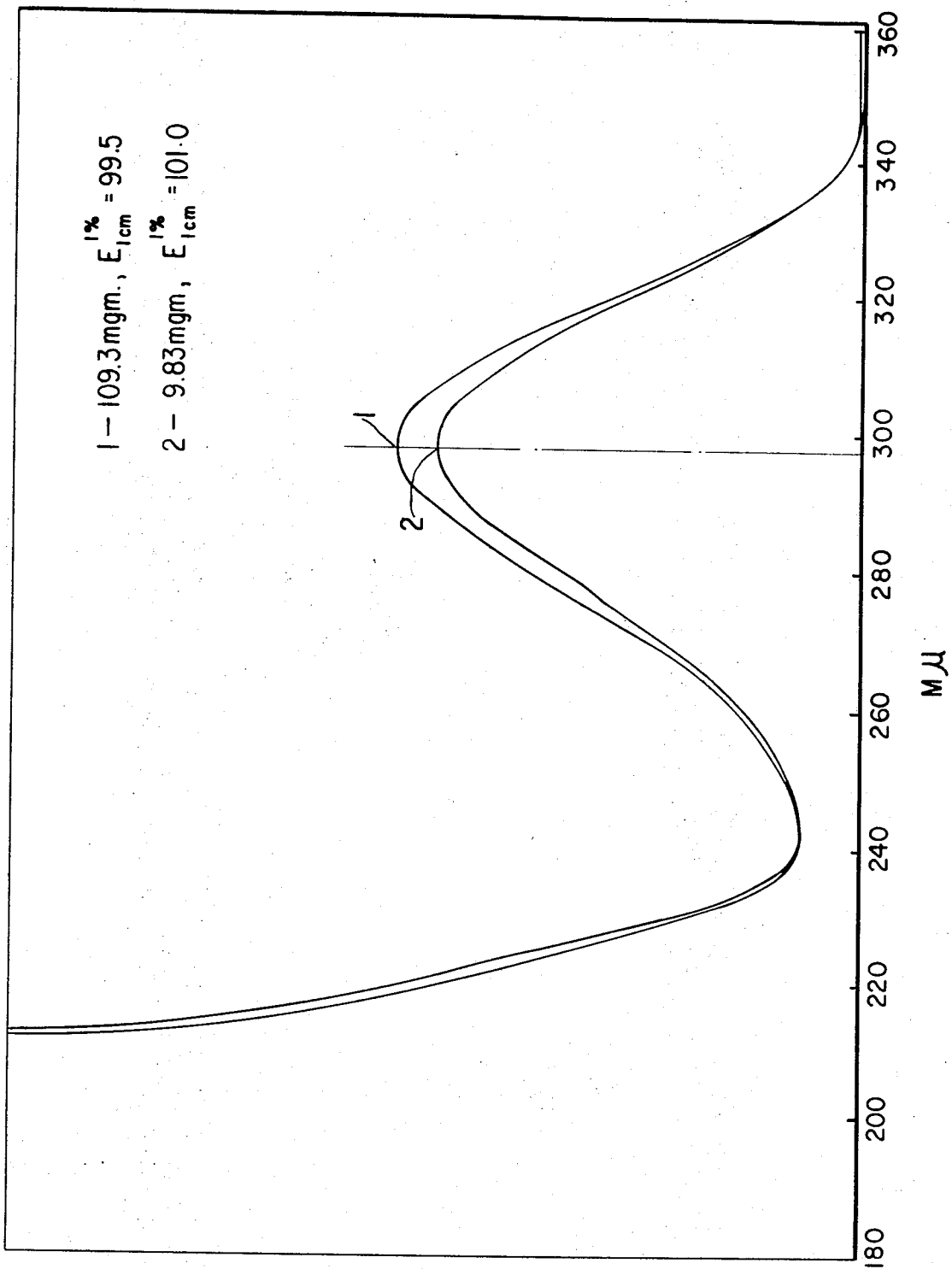
Figure 2:
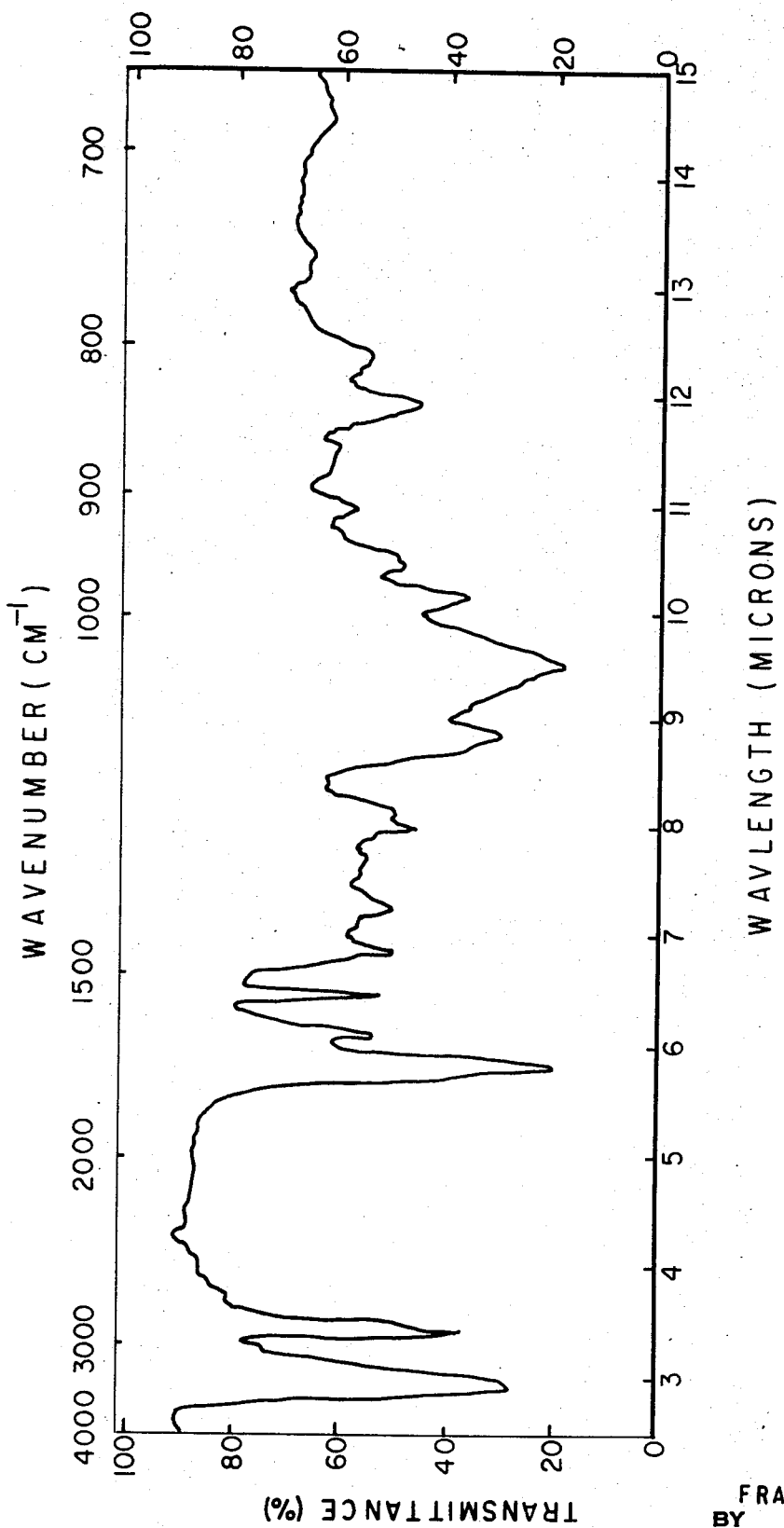

In the attached drawings, FIG. 1 is the UV-spectrum, and FIG. 2 the IR-spectrum of scilliglaucosidin-19-ol-α-L-rhamnoside.

The following example further illustrates the present invention and will enable others skilled in the art to understand it more completely.

EXAMPLE 1

5.0 gm. of scilliglaucosidin-α-L-rhamnoside were dissolved in 50 cc. of ethanol, and the solution was admixed with small portions of a total of 0.2 gm. of sodium borohydride, accompanied by stirring. The progress of the reduction was followed by thin-layer chromatography, that is, by periodically subjecting samples of the reaction mixture to chromatographic resolution on silica gel-G plates with the aid of a mixture of chloroform and ethanol (7.5:2.5). Upon spraying the plates with antimony trichloride reagent, the starting compound assumed a dirty green-grey color (R$_f$-value about 0.58), whereas the reaction product turned blue-violet (R$_f$-value about 0.42).

After 30 minutes of stirring at room temperature the reduction reaction had gone to completion. The reaction solution was adjusted to pH 6 with 1 N sulfuric acid, the inorganic salt precipitated thereby was filtered off, and the filtrate was evaporated to dryness in vacuo. The dry residue (5.1 gm.) was recrystallized twice from acetonitrile for purification purposes and was then dried in vacuo over phosphorus pentoxide. The colorless product had the empirical formula C$_{30}$H$_{42}$O$_9$ and melting point of 208–210° C. after frothing at 150–155° C. Its UV-spectrum showed a maximum at 298 mμ (log ε=3.74; see FIG. 1), and its IR-spectrum showed maxima at 1710, 1635, 1535 and 1050 cm.$^{-1}$ (see FIG. 2). With Liebermann-Burchard's reagent the product according to the invention exhibited a color transition from violet-pink, through blue, blue-green to green, and with concentrated hot formic acid turned faintly green, whereas no color reaction occurred with Rosenheim's reagent.

Upon recrystallization from aqueous solvents, the compound according to the present invention was obtained as the monohydrate, which, upon drying in vacuo at about 80° C. over phosphorus pentoxide, lost part of its water of crystallization and formed the semihydrate. Recrystallized from anhydrous solvents, the compound was obtained without water of crystallization.

The melting points of each of these forms of scilliglaucosidin-19-ol-α-L-rhamnoside are very indistinct and of little characterizing value. After initial sintering, the products melt, accompanied by browning and evolution of gas. The end point, at which a clear melt is obtained, depends largely upon the working conditions. Upon rapid heating in a metal block, decomposition temperatures above 200° C. are obtained. The approximate melting points given below were determined by the method of USP XVI.

*Analysis.*—Calculated for C$_{30}$H$_{42}$O$_9$·H$_2$O (percent): C, 63.81; H, 7.85; O, 28.34. Found (percent): C, 63.95; H, 7.68; O, 28.60. Specific optical rotation: C=1 in methanol [α]$_D^{20}$=−77.2°±2°. Melting point: Sintering at about 150° C., indistinct melting accompanied by decomposition at about 160–170° C.

*Analysis.*—Calculated for C$_{30}$H$_{42}$O$_9$·½H$_2$O (percent): C, 64.95; H, 7.80; O, 27.40; H$_2$O, 1.44. Found (percent): C, 64.92; H, 7.76; O, 27.84; H$_2$O, 1.61. Melting point: Sintering at about 160° C., indistinct melting accompanied by decomposition at about 175–180° C.

*Analysis.*—Calculated for C$_{30}$H$_{42}$O$_9$ (percent): C, 65.91; H, 7.74; O, 26.34. Found (percent): C, 65.86; H, 7.86; O, 26.13. Specific optical rotation: C, 1 in methanol [α]$_D^{20}$=−79.4°±2°. Melting point: Sintering at about 170° C., indistinct melting accompanied by decomposition at about 175–185° C.

Scilliglaucosidin-19-ol-α-L-rhamnoside has useful cardiac-active properties. More particularly, the compound of the present invention increases the ability of the heart muscle to contract and changes the heart beat frequency in warm-blooded animals, such as guinea pigs and cats, as evidenced by the following tests:

Quantitative measurements on isolated guinea pig ventricles immersed in a physiological bath were made, where varying doses of scilliglaucosidin-19-ol-α-L-rhamnoside in aqueous solution were added to the bath. The following results were obtained:

| | Dose (dissolved in 50 cc. of water, γ) | Increase in amplitude of contraction [1] | Change in beat frequency (beats/min.) | Latent time to inotropic max. (min.) |
|---|---|---|---|---|
| No. of Tests: | | | | |
| 6 | 0.5 | +20 | −3 | 21 |
| 6 | 1.0 | +35 | +10 | 19 |
| 2 | 2.0 | +55 | +26. | 5 |

[1] In percent over initial value.

The acute lethal dose ($LD_{100}$), i.e. the dose which is lethal to all of the test animals, determined as infusion toxicity in guinea pigs under urethane anesthesia by the method of Knaffl-Lenz, was found to be 0.198 mgm./kg. i.v.

For pharmaceutical purposes the compound according to the present invention is administered to warm-blooded animals perorally or parenterally, preferably perorally, as an active ingredient in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compound according to the present invention is from 0.00083 to 0.05, preferably 0.00166 to 0.02, mgm./kg. body weight.

In addition to scilliglaucosidin-19-ol-α-L-rhamnoside, such compositions may also contain one or more other cardiac-active compounds, such as glycosides of the scilla or digitalis type, pyrimido-pyrimidine derivatives, as well as theophylline derivatives such as 7-β-oxy-propyltheophylline which simultaneously act as solubility promoters; moreover, they may also contain one or more compounds having another pharmacodynamic effect, such as sympathicomimetics.

The following example illustrates a dosage unit composition comprising the compound of the instant invention as an active ingredient and represents the best mode contemplated of putting the invention to practical use. The parts are parts by weight unless otherwise specified.

EXAMPLE 2

Drop solution for oral administration

The solution was compounded from the following ingredients:

| | Parts |
|---|---|
| (-)-1-p-hydroxyphenyl-2-methylaminoethanol - (1) | 50.00 |
| Scilliglaucosidin-19-ol-α-L-rhamnoside | 0.25 |
| 7-β-oxypropyl-theophylline | 200.00 |
| $Na_2S_2O_5$ | 1.50 |
| Sodium salt of EDTA | 1.50 |
| Tartaric acid | 3.75 |
| Saccharin sodium | 1.00 |
| p-Hydroxy-benzoic acid methyl ester | 0.45 |
| p-Hydroxy-benzoic acid propyl ester | 15.00 |
| Ethanol | 75.00 |
| Demineralized water q.s.ad 1500.00 parts by vol. | |

Compounding procedure:

The glycoside was dissolved in the ethanol, and the esters of p-hydroxybenzoic acid were dissolved in the total required amount of hot demineralized water. After the aqueous solution had cooled, the remaining ingredients were dissolved therein, and the resulting solution was admixed with the ethanolic solution of the glycoside. The pH of the combined solution was 5.0. 1.5 cc. (20 drops) thereof contained 0.25 mgm. of silliglaucosidin-19-ol-α-L-rhamnoside and, when administered perorally to a warm-blooded animal of about 60 kg. body weight in need of such treatment, substantially increased the ability of the heart muscle to contract and the heart beat frequency.

The amount of cardiac-active glycoside in Example 2 may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claim.

I claim:
1. Scilliglaucosidin-19-ol-α-L-rhamnoside, having the empirical formula $C_{30}H_{42}O_9$, an ultraviolet adsorption maximum at 298 mμ (log ε=3.74), an infrared spectrum showing peakbands at 1710, 1635, 1535 and 1050 cm.$^{-1}$, and a specific rotation $[\alpha]_D^{20} = -79.4° \pm 2°$ (in methanol).

References Cited

UNITED STATES PATENTS

| 3,206,359 | 9/1965 | Sarett et al. | 260—210.5 |
| 3,223,587 | 12/1965 | Wilkinson | 260—210.5 |
| 3,361,630 | 1/1968 | Steidle | 260—210.5 |

OTHER REFERENCES

Heidenreich et al. "Chem. Abst." vol. 66, 1967 p. 84461z.

Von Wartburg et al. "Chem. Abst." vol. 66, 1967 p. 85986m.

LEWIS GOTTS, Primary Examiner

J. R. BROWN, Assistant Examiner

U.S. Cl. X.R.

424—182